United States Patent
Guo et al.

(10) Patent No.: US 7,801,957 B2
(45) Date of Patent: Sep. 21, 2010

(54) APPARATUS AND METHOD FOR FAIR MESSAGE EXCHANGES IN DISTRIBUTED MULTI-PLAYER GAMES

(75) Inventors: Katherine H Guo, Eatontown, NJ (US); Sarit Mukherjee, Morganville, NJ (US); Sanjoy Paul, Marlboro, NJ (US); Sampath Rangarajan, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/478,130

(22) Filed: Jun. 4, 2009

(65) Prior Publication Data

US 2009/0291763 A1 Nov. 26, 2009

Related U.S. Application Data

(63) Continuation of application No. 10/789,585, filed on Feb. 27, 2004, now Pat. No. 7,584,248.

(51) Int. Cl.
G06F 15/16 (2006.01)
(52) U.S. Cl. ............... 709/205; 709/231; 709/232; 709/234; 709/248
(58) Field of Classification Search ............. 709/205, 709/231, 232, 234, 248
See application file for complete search history.

(56) References Cited

U.S. PATENT DOCUMENTS 3,755,628 A 8/1973 Games et al.
4,473,889 A 9/1984 Ross
4,633,421 A 12/1986 Watson et al.

(Continued)

OTHER PUBLICATIONS http://www.linuxtoday.com/mailprint.php3?action=pv&Itsn=1999-12-22-002-04-NW-GM, "id Software Releases Quake 1 Source Code Under The GPL".

(Continued)

*Primary Examiner*—Thu Nguyen
*Assistant Examiner*—Hieu T Hoang
(74) *Attorney, Agent, or Firm*—Wall & Tong, LLP

(57) ABSTRACT

The Fair-Order Service of the present invention delivers action messages to the server as soon as it is feasible. Because action messages from different players exhibit different reaction times with respect to an update message, the Fair-Ordering Service executed at the server dynamically enforces a sufficient waiting period on each action message to guarantee the fair processing of all action messages. In reality, the waiting period at the server is bounded because of the real-time nature of interactive games. The algorithms that offer Fair Ordering Service take into consideration delayed and out-of-order action messages. When action messages corresponding to multiple update messages are interleaved, the Fair-Ordering Service matches the action message to the appropriate update message. It accomplishes this by maintaining a window of update messages and using the reaction times for an action message for each of the update messages in the window. This enables state changes at the game server to be performed with fairness to all the players. The Fair-Order Service invention is based on a framework that uses a proxy architecture making it transparent to any specific game application. The service is well suited to client-server based, online multi-player games, where a fair order of player actions is critical to the game outcome.

14 Claims, 9 Drawing Sheets

EXAMPLE SHOWING THE FAIR-ORDER MESSAGE DELIVERY ALGORITHM.

U.S. PATENT DOCUMENTS

| | | | |
|---|---|---|---|
| 5,820,463 A * | 10/1998 | O'Callaghan | 463/42 |
| 6,604,145 B1 | 8/2003 | Bell et al. | |
| 6,763,371 B1 | 7/2004 | Jandel | |
| 6,903,681 B2 | 6/2005 | Faris et al. | |
| 6,917,984 B1 | 7/2005 | Tan | |
| 6,996,699 B2 | 2/2006 | Chrysanthakopoulos et al. | |
| 2002/0026321 A1 | 2/2002 | Garis et al. | |
| 2002/0103029 A1 * | 8/2002 | Finlayson et al. | 463/42 |
| 2002/0152271 A1 | 10/2002 | Chafle et al. | |
| 2003/0027639 A1 | 2/2003 | Peterson et al. | |
| 2003/0123491 A1 | 7/2003 | Couillard | |
| 2003/0188192 A1 | 10/2003 | Tang et al. | |
| 2003/0204565 A1 | 10/2003 | Guo et al. | |
| 2004/0152519 A1 | 8/2004 | Wang et al. | |
| 2004/0230695 A1 * | 11/2004 | Anschutz et al. | 709/232 |
| 2005/0083939 A1 | 4/2005 | Yasukawa et al. | |

OTHER PUBLICATIONS

Yahn W. Bernier, Latency Compensating Methods in Client/Server In-Game Protocol Design and Optimization, Game Developers Conference, San Jose, CA 2001; Proceedings Archive http://www.gamesutra.com/features/gdcarchive/2001/index.htm.

Y.-J. Lin et al., "Sync-MS: Synchronized Messaging Service for Real-Time Multi-Player Distributed Games," *Proc. Of $10^{th}$ IEEE International Conference on Network Protocols (ICNP)*, Nov. 2002.

Y.W. Bernier, "Latency compensating Methods in Client/Server In-game Protocol Design and Optimization," *Proc. Of Game Developers Conference '01*, 2001.

M. Mauve, "Consistency in Replicated Continuous Interactive Media," *Proc. Of the ACM Conference on Computer Supported Cooperative Work (CSCW'00)* 2000, pp. 181-190.

L. Gautier et al., "Design and Evaluation of MiMaze, a Multiplayer Game on the Internet," *Proc. Of IEEE Multimedia (ICMS'98)*, 1998, pp. 233-236.

Lamport, Time, clocks and the ordering of events in distributed system, Comm. ACM, vol. 21, No. 7, pp. 558-565, 1978.

* cited by examiner

DISTRIBUTED GAME ENVIRONMENT
WITHOUT PROXIES

DISTRIBUTED GAME ENVIRONMENT
WITH SERVER AND PLAYER PROXIES

FAIR-ORDER MESSAGE DELIVERY FOR STATE TRANSITIONS SHOWN IN FIG. 2

MESSAGE FROM $P_1$ WITH SEQ. NO 101 HAS NOT ARRIVED.

| $M_1(P_1)$ 102 | $M_2(P_2)$ 112 | $M_3(P_1)$ 103 | $M_4(P_1)$ 104 |

→ NOT SEQUENCED

FIG. 6A

MESSAGE FROM $P_1$ WITH SEQ. NO 101 HAS NOT ARRIVED BUT DELIVERY TIME OF $M_1$ IS REACHED AND $M_1$ IS DELIVERED.

| $M_2(P_2)$ 112 | $M_3(P_1)$ 103 | $M_4(P_1)$ 104 |

→ SEQUENCED

FIG. 6B

EXAMPLE WHERE MESSAGES ARRIVE AFTER THEIR WAIT TIMEOUT.

---

ALGORITHM FAIR-ORDER MESSAGE DEQUEUING (ACTION_MESSAGE $M_k$):
1: DELIVERY $M_k$ AT $D(M_k)$;
2: IF (DELIVERY QUEUE SIZE > 1)
3:   RECOMPUTE DELIVERY TIME OF EXISTING MESSAGES;

ADDITIONAL ALGORITHM FOR FAIR-ORDER MESSAGE DEQUEUING WHEN MESSAGES DO NOT ARRIVE WITHIN THEIR WAIT TIMEOUT.

FIG. 7

EXAMPLE OF AN INCONSISTENT VIEW OF THE GAME
BETWEEN TWO PLAYERS, WHERE THE SEQUENCE OF STATE CHANGES
AT THE SERVER IS SHOWN IN FIG. 2

EXAMPLE SHOWING THE FAIR-ORDER MESSAGE DELIVERY ALGORITHM WITH OUT-OF-ORDER MESSAGE RECEPTION.

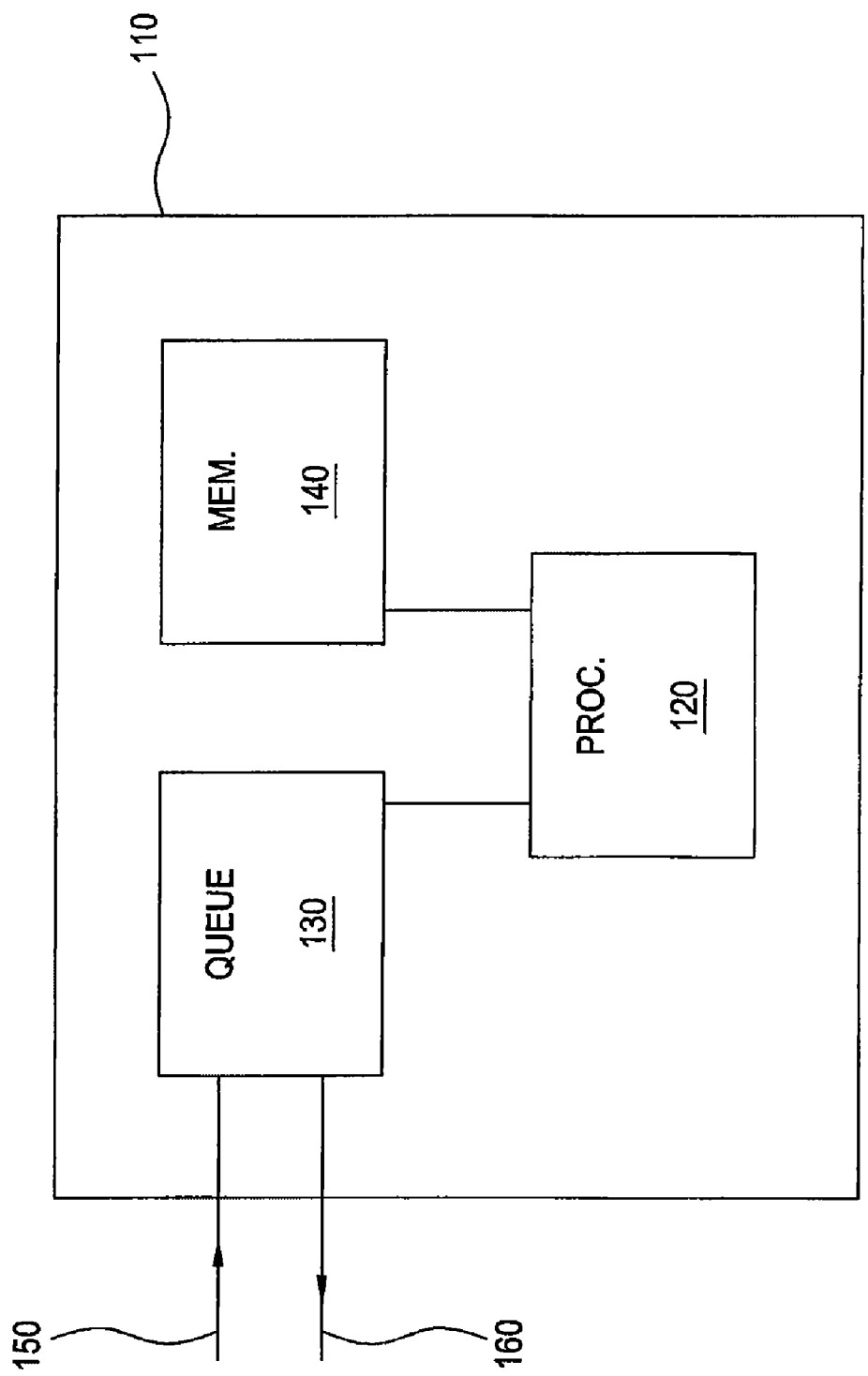

APPARATUS AND METHOD FOR FAIR MESSAGE EXCHANGES IN DISTRIBUTED MULTI-PLAYER GAMES

RELATED APPLICATIONS

This application is a continuation of and claims priority to U.S. patent application Ser. No. 10/789,585, filed on Feb. 27, 2004 now U.S. Pat. No. 7,584,248 and entitled Apparatus and Method for Fair Message Exchanges in Distributed Multi-Player Games, which application is incorporated herein by reference. This application is related to U.S. patent application Ser. No. 10/135,053, filed on Apr. 29, 2002 and entitled Method and Apparatus for Supporting Real-Time Multi-User Distributed Applications, which issued as U.S. Pat. No. 7,133,927 on Nov. 7, 2006, which application is incorporated herein by reference.

FIELD OF THE INVENTION

The present invention relates generally to communications networks, and more particularly to the support of real-time multi-user distributed applications on such networks.

BACKGROUND OF THE INVENTION

Real-time, multi-user distributed applications, such as online multi-player games or distributed interactive simulations (DIS), are becoming increasingly popular due to advances in game design and the availability of broadband Internet access to the end-user. Online multi-player games can be implemented either using the peer-to-peer model or the client-server model. In the peer-to-peer model players send their actions to each other and react on the received action, whereas in the client-server model all messages from players that carry their actions are ordered at a single server. In the peer-to-peer model, event consistency has been well studied using the concepts of logical clocks, causal ordering and total ordering in distributed systems. In the client-server model, consistency is automatically guaranteed because messages from all the players are only delivered at the central game server and, therefore, all messages follow both causal and total ordering. However, fairness in neither model has been addressed. Today most online multi-player games are implemented based on a client server model. This is due to the complexity of a peer-to-peer model based implementation as well as security restrictions that prevent peer-to-peer communication. The present invention focuses on games based on the client-server model. The design and implementation of such games should include an underlying fairness property for the players. This is challenging, however, in cases where players, distributed over wide geographic areas, participate in a game together.

In the client-server model, an authoritative game server is set up and all players or clients contact this game server to play the game against one another. The game server keeps track of the global state of the game. Players send their actions to the game server in messages referred to as action messages. The game server then processes the actions in sequence, changes the global state, and notifies players of the effects of their actions in messages termed state update messages or simply update messages. The state change that is communicated to the players may lead to more action messages being sent to the game server. The only communication in the system is between the game server and players. Players themselves do not send messages to one another, neither do they play any active role in deciding the ordering of actions in the game. Because of the real-time nature of online multi-player games, the majority of action and state update messages are sent over UDP; only a few messages are sent over TCP and only at game start-up. Because of this, applications have built-in mechanisms to handle message loss. For example, messages contain absolute location of objects instead of relative ones, therefore, there is no dependency on previous messages in case they are lost.

Much of the focus on improving real-time, online multi-player games is on how to reduce player experienced response time. For timely state updates at player consoles, dead reckoning is commonly used to compensate for packet delay and loss. For client-server based first person shooter games, Y. W. Bernier, "Latency Compensation Methods in Client/Server In-game Protocol Design and Optimization," in Proc. Of Game Developers Conference'01, 2001, discusses a number of latency compensating methods at the application level which are proprietary to each game. These methods are aimed at making large delays and message loss tolerable for players but do not consider the problems introduced by varying delays from the server to different players.

Using the current best-effort Internet, players can experience erratic game progress that often prevents a player from responding effectively or appropriately. This can lead to player frustration, especially if the gaming environment is competitive. In addition, because the game server is in charge of updating global states, and the network delay from the game server to different players is different, players may receive the same state update at different times. Furthermore, players' action messages can also take different times to reach the game server, therefore unfairness in processing player action messages can be created at the game server. A player further away from the game server or connected to the server through congested or slower links will suffer from longer message delay. Because of this, even fast reacting players may not be given credit for their actions, leading to an unfair advantage for players with small message delays.

SUMMARY OF THE INVENTION

The Fair-Order Service of the present invention delivers action messages to the server as soon as it is feasible. Because action messages from different players exhibit different reaction times with respect to an update message, the Fair-Ordering Service executed at the server dynamically enforces a sufficient waiting period on each action message to guarantee the fair processing of all action messages. In reality, the waiting period at the server is bounded because of the real-time nature of interactive games. The algorithms that offer Fair Ordering Service take into consideration delayed and out-of-order action messages. When action messages corresponding to multiple update messages are interleaved, the Fair-Ordering Service matches the action message to the appropriate update message. It accomplishes this by maintaining a window of update messages and using the reaction times for an action message for each of the update messages in the window. This enables state changes at the game server to be performed with fairness to all the players. The Fair-Order Service invention is based on a framework that uses a proxy architecture making it transparent to any specific game application. The service is well suited to client-server based, online multi-player games, where a fair order of player actions is critical to the game outcome.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 5 shows an exemplary algorithm for fair-order message queuing in accordance with the present invention;

FIGS. 6A and 6B shows an example where messages arrive after their wait timeout;

FIG. 7 shows an exemplary algorithm for fair-order message dequeuing in accordance with the present invention;

FIG. 11 is an exemplary embodiment of a proxy device used in connection with the present invention.

DETAILED DESCRIPTION

Figure 1A:
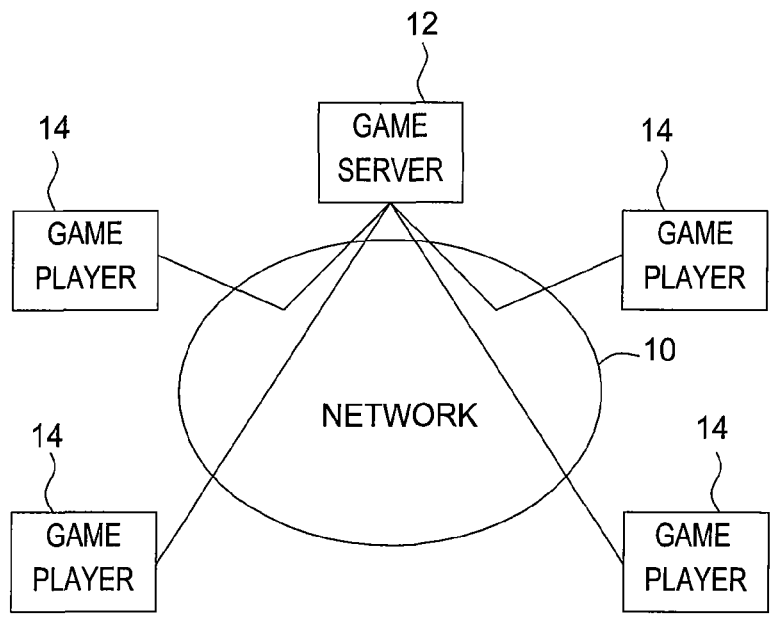
FIGS. 1A and 1B show exemplary embodiments of a distributed game environment.

The above mentioned unfairness problem is the focus of the present invention. Assuming that update messages are delivered to players at the same physical time, a fair order of message delivery would be one where action messages in response to these update messages are delivered to the server in the order in which they are produced by the players in physical time. This ensures that a player who reacted first to an update message by sending an action message will influence the state of the game before a player who reacted later. One earlier work on fair-ordering of action messages, the Sync-MS service by Y. Lin, K. Guo, and S. Paul, "Sync-MS: Synchronized Messaging Service for Real-Time Multi-Player Distributed Games," in Proc. of 10$^{th}$ IEEE International Conference on Network Protocols (ICNP), November 2002, is based on a fairness definition for both state update messages and action messages. The Sync-MS service consists of two parts, Sync-out and Sync-in, where Sync-out delivers each state update message from the server to all players at the same physical time, and Sync-in at the server processes action messages in the order of the physical time they are sent. But in order to deliver messages to all the players at the same physical time, two main assumptions are made: (i) the clocks at all the players are synchronized and all these clocks are synchronized with the server clock as well, and (ii) the one-way delay from the server to each of the players can be accurately estimated. The above assumptions are required because an attempt is made to order action messages according to the physical time in which the players produce these messages. Further, this work does not consider the interleaving that may happen between action messages corresponding to multiple update messages and the effect of such interleaving on the state of the game that is maintained at the server.

Without making the above assumptions, the same fair-order delivery effect can be achieved by delivering the action messages to the server in the order of increasing reaction time which is the time between the reception of an update message at a client and the sending of an action message in response to the update message. This removes the need to deliver update messages to all the players at the same physical time. Based on this idea, a novel network service is disclosed called Fair-Ordering Service, designed for client-server based, distributed, multi-user real-time applications such as online multi-player games. It addresses the issue of player action message fairness based on player reaction time. Note that the Fair-Ordering Service does not attempt to shorten network delays between the server and players but provides a framework that ensures fairness to players even when network delays are large and variable. Delay reductions could come from advances in CPU, link speed or game specific features, and therefore is orthogonal to a service that provides fair order delivery.

Unlike existing techniques that use bucket synchronization mechanisms that depend on imposing a worst case delay on action messages, the Fair-Order Service of the present invention delivers action messages to the server as soon as it is feasible. Because action messages from different players exhibit different reaction times with respect to an update message, the Fair-Ordering Service executed at the server dynamically enforces a sufficient waiting period on each action message to guarantee the fair processing of all action messages. In reality, the waiting period at the server is bounded because of the real-time nature of interactive games. The algorithms that offer Fair Ordering Service take into consideration delayed and out-of-order action messages. When action messages corresponding to multiple update messages are interleaved, the Fair-Ordering Service matches the action message to the appropriate update message. It accomplishes this by maintaining a window of update messages and using the reaction times for an action message for each of the update messages in the window. This enables state changes at the game server to be performed with fairness to all the players.

The Fair-Order Service invention is based on a framework that uses a proxy architecture making it transparent to any specific game application. The service is well suited to client-server based, online multi-player games, where a fair order of player actions is critical to the game outcome. Examples of such games include first person shooter games like Quake, R. Swamy, "idSoftware Releases Quake 1 Source Code Under the GPL,"and real-time role playing games such as Dark Age of Camelot, Mythic Entertainment, "Dark Age of Camelot-."The game framework is clearly defined and its applicability in practice is illustrated through examples.

Message Exchange Framework for Distributed Games

As discussed, the present invention relates to a network-based service for distributed multi-player games called Fair-Ordering Service. The service guarantees fair-ordering for action messages that are received at the server from all players in the game. The client-server based system consists of a game server 12 and a number of game players 14 (e.g., player devices) distributed over a network 10 as shown, for example, in FIG. 1A. The server sends state update messages to the players to inform them of the latest state of the game. Each player processes the update messages, displays the current state of the game and produces action messages based on the reaction of the human player on the current state. Multiple action messages may be sent by a player in response to one update message.

Figure 1B:
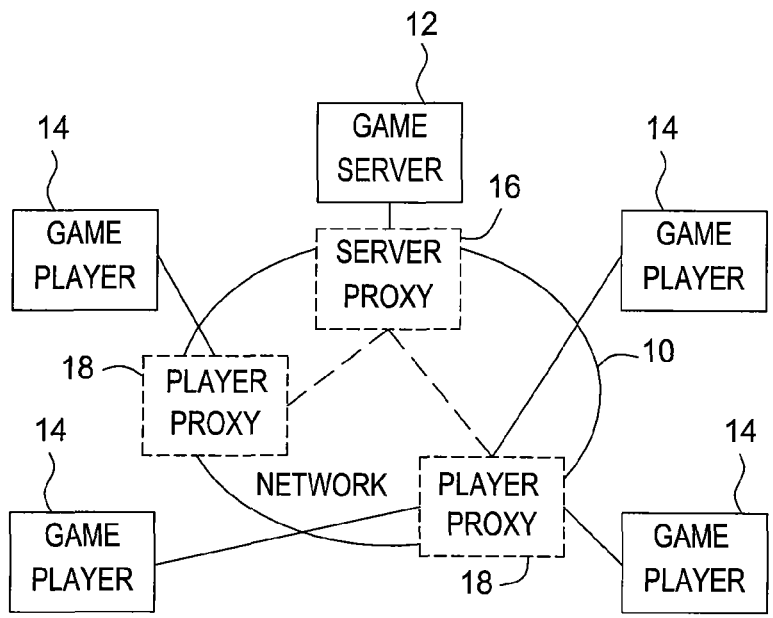

In order to perform the fair-ordering service, we introduce proxies for the server and the players, referred to as server proxy 16 and player proxy 18, respectively (FIG. 1B). The proxies could be co-located with the applications themselves, be part of the application or they could be one or more separate elements. Accordingly, when referring to proxy in the specification and the claims of the application it is understood that the proxy refers generally to the functionality of the invention and that the location of the proxy may be in any one of the above locations. As shown in FIG. 1B, both update and action messages are intermediated through the proxies. We assume that the network delay between proxies and their respective server or player is negligible.

The invention takes into account the most general distributed environment where (1) the underlying network transport may not guarantee any desired ordering of message delivery from multiple sources, (2) messages from the same source may reach their common destination out of order, or may get lost in transport, and (3) the individual players and the game server do not have their clocks synchronized.

As will be explained in greater detail herein, the server proxy receives update messages from the game server, tags them with message numbers and sends them to the player proxies. It receives action messages from the player proxies, orders them to ensure fairness based on the additional information with which the player proxies augment the action message, and delivers them to the game server. The player proxy receives update messages from the server proxy and delivers them to the players. In the other direction, it tags the action messages sent by the players with the appropriate information as described herein, and sends them to the server proxy. Notice that in the described exemplary embodiment the proxies are completely transparent to specific games; that is, they are not aware of the semantics of a particular game.

State and State Transitions

The state of a game at the server is defined to be a set of objects and their positions. A state transition takes place when there is a change in the set of objects or the positions of the objects. State update messages are sent by a server periodically to the players either to inform the player of a state transition or simply the current positions of the objects. The interval between two consecutive update messages sent by the server is typically 40 ms for real-time video display at 25 frames per second. For simplicity, the examples set forth herein only illustrate state transitions where there is a change in the set of objects.

Figure 2:
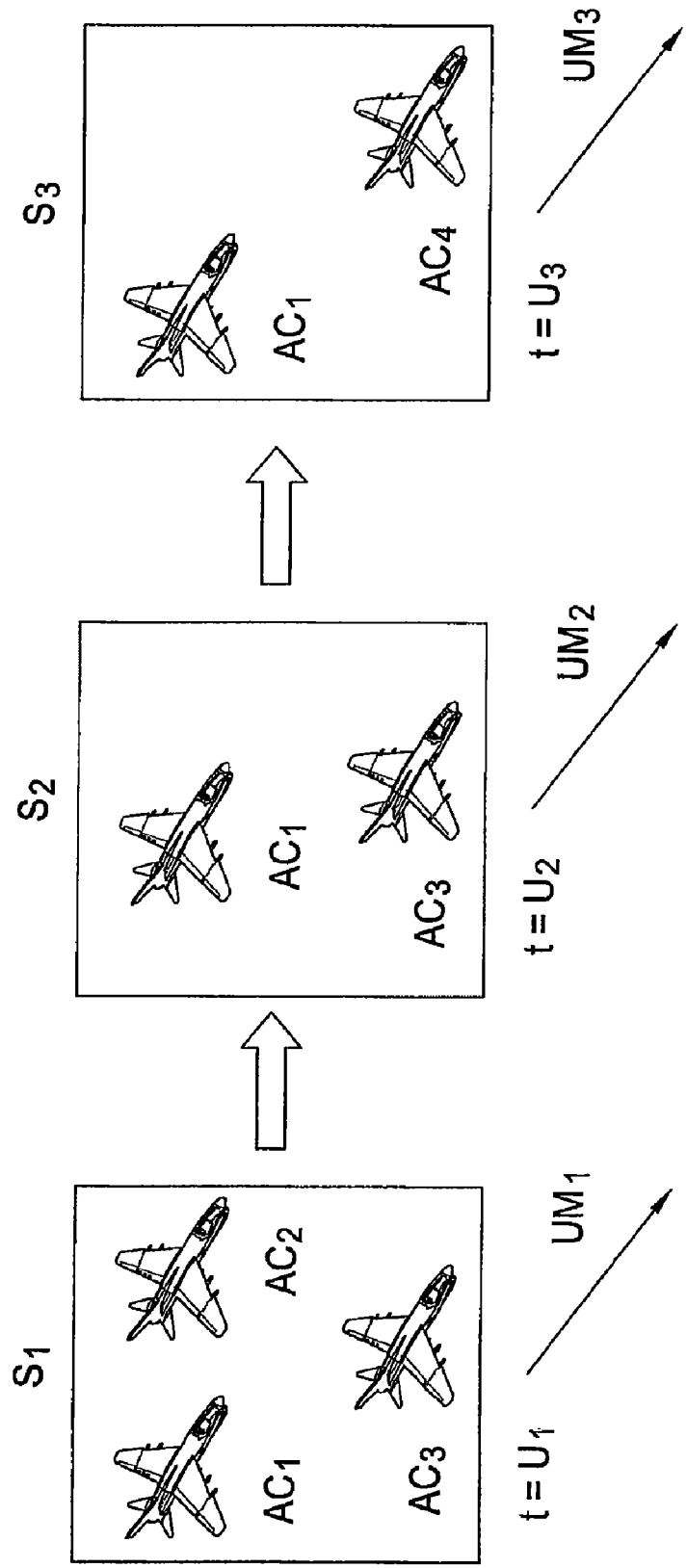
FIG. 2 shows an example of a state and its transition.

FIG. 2 assists in illustrating the definition of state transition. The initial state of the game $S_1$ shows three aircraft $AC_1$, $AC_2$ and $AC_3$. An update message $UM_1$ is sent to the players with this state information at time $U_1$. The next state $S_2$ shows only aircraft $AC_1$ and $AC_3$. $AC_2$ has been removed because of an action message that the server received from some player. An update message $UM_2$ is sent at time $U_2$ to notify the players of the state transition. State $S_3$ shows aircraft $AC_1$ and $AC_4$. Aircraft $AC_3$ has been removed and aircraft $AC_4$ has been included. A corresponding update message is also sent to the players. Thus, a state transition involving change of objects, not positions, may be due to one of the following reasons: (a) removal of objects, (b) inclusion of objects, and (c) removal as well as inclusion of objects. A state change always leads to an update message being sent.

Fair-Order

Figure 3:
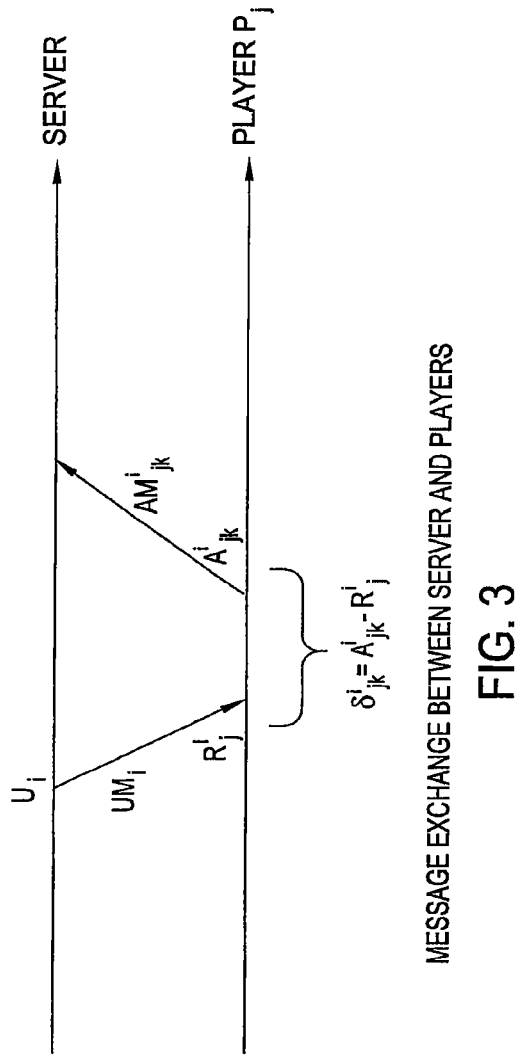
FIG. 3 illustrates an exemplary message exchange between server and players in accordance with the present invention.

Let us now examine the message exchanges between the server and the players and their effect on the state of the game. FIG. 3 shows a timing diagram of an instance of message exchange between the server and the player $P_j$. Let $U_i$ denote the server's local time at which the server sends an update message $UM_i$. Player $P_j$ receives $UM_i$ at its local time $R^i_j$. After receiving an update message, the player acts on it, which in turn generates an action message. We refer to the duration between reception of an update message and transmission of an action message by a player as reaction time. $AM^i_{jk}$ denotes the $k^{th}$ action message sent by player j at its local time $A^i_{jk}$ after acting on $UM_i$ from the server. Let $\delta^i_{jk} = A^i_{jk} - R^i_j$ denote the corresponding reaction time. For each update message, the Fair-Ordering Service delivers player action messages (corresponding to that update message) to the server in an increasing order of the reaction times.

Consider FIG. 3 again and assume the message exchanges are between the proxies for both the server and player $P_j$. Let $\rightarrow$ denote the delivered before relationship between two messages. Then, fair-order delivery will need to satisfy the following three conditions.

Fair Order Conditions

1) For update message $UM_i$ and player $P_j$, $AM^i_{jk} \rightarrow AM^i_{j(k+1)}$ for all k, and l>0. That is, all action messages produced by a player in response to an update message are delivered to the server in the order in which they were produced, and 2) For update message $UM_i$ and players $P_j$ and $P_n$, $AM^i_{jk} \rightarrow AM^i_{nl}$, for all j, k, l and n≠j, if $(\delta^i_{jk} = A^i_{jk} - R^i_j) < (\delta^i_{nl} = A^i_{nl} - R^i_n)$. That is, action messages from two different players corresponding to the same update message are delivered in increasing order of reaction times, and 3) For update messages $UM_a$ and $UM_{a+x}$, x>0, $AM^a_{jk} \rightarrow AM^{a+x}_{nl}$ for all j, k, n and l. That is, all action messages produced in response to an update message from all players are delivered to the server before delivering action messages that are produced in response to an update message that was sent later.

In an ideal distributed game environment where all players have a synchronized clock and message delivery over the network takes the same amount of time for every player, fair-order can be achieved if the action messages from the players are ordered based on the physical times at which they are generated. It is easy to see that in this ideal situation, such ordering would result in the action messages being ordered in an increasing order of reaction times. In practice, however, neither the players' clocks are synchronized nor the delay in message delivery is the same or even known a priori. The fair-ordering requirements enumerated above provide fair processing of the action messages without these assumptions. In essence, for game applications it makes sense to award a player with the fastest reaction time, and the Fair-Ordering Service ensures that.

Figure 4:
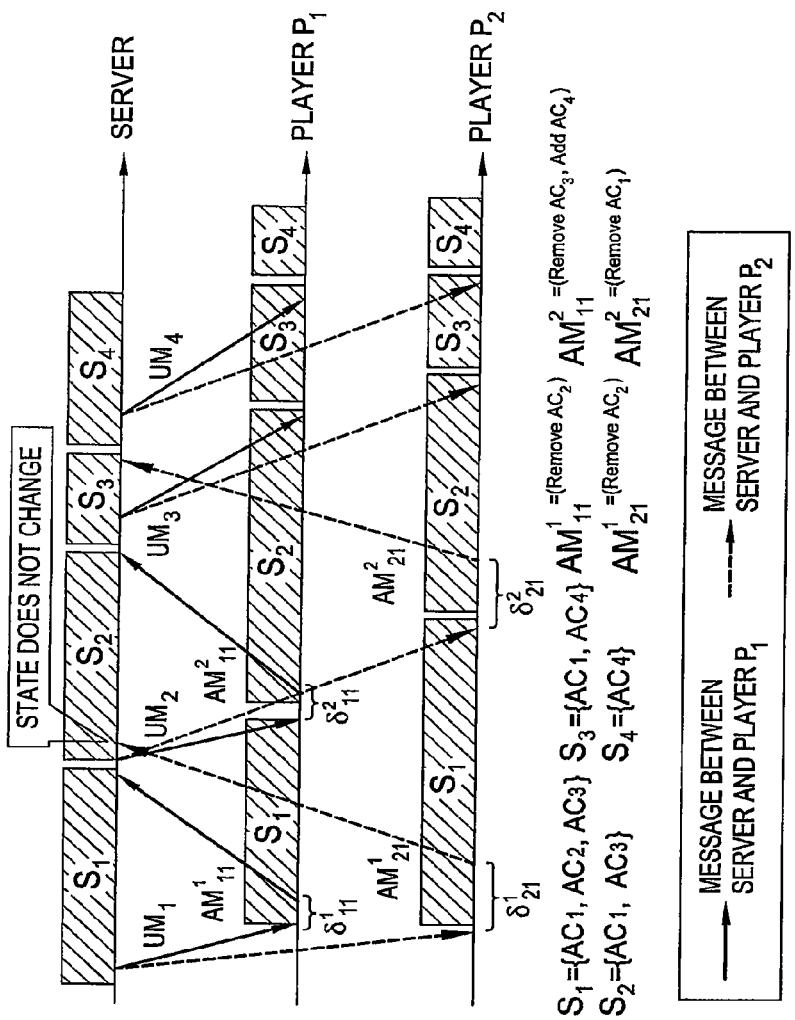
FIG. 4 shows a fair order message delivery for state transitions shown in FIG. 2.

Referring to FIG. 4, an example of the Fair-Ordering Service in accordance with the present invention is illustrated. The fair-order message distribution and the state changes happen in the server and players $P_1$ and $P_2$. The server and player proxies (not shown in the Figure) work transparently to the server and the players to ensure fair-ordering of the messages. When the state of the game is $S_1$, update message $UM_1$ is sent by the server and received by both players. Players may receive $UM_1$ at different instants of local time (that is, $R^1_1 \neq R^1_2$) due to variability in network conditions. As noted previously, they run independent clocks that may neither be synchronized with each other nor with the game server. $P_1$ sends an action message $AM^1_{11} = \langle$Remove $AC_2\rangle$, which is received at the server proxy with reaction time $\delta^1_{11}$. $P_2$ also sends an action message $AM^1_{21} = \langle$Remove $AC_2\rangle$ with reaction time $\delta^1_{21} > \delta^1_{11}$. The server proxy receives both action messages, and inspection of the reaction times reveals that player $P_1$ has acted on state $S_2$ of the game quicker than player $P_2$. Therefore, the action $\langle$Remove $AC_2\rangle$ is attributed to $P_1$, not to $P_2$, regardless of the relative arrival order of $AM^1_{11}$ and $AM^1_{21}$. With Fair-Ordering Service, the server delivers $AM^1_{11}$ from $P_1$ to the server first. Note that FIG. 4 depicts the delivery instances of action according to fair order. The server acts on this message and $AC_2$ is removed. This action message changes the state to $S_2$ and update message $UM_2$ is sent at time $U_2$. When the action message $AM_{21}{}^1$ from $P_2$ is delivered and processed at the server, it will be done with respect to state $S_2$. As $AC_2$ has already been removed and is not part of state $S_2$, this action message leads to no operation being performed by the server. $P_1$ collects credit for removing $AC_2$, but $P_2$ does not, therefore fairness is ensured.

Now assume that $UM_2$ reaches the players and they send action messages $AM_{11}{}^2 = \langle$Remove $AC_3$, Add $AC_4\rangle$ and $AM_{21}{}^2 = \langle$Remove $AC_1\rangle$, respectively with reaction times $\delta_{11}{}^2 < \delta_{21}{}^2$. Again with Fair-Ordering Service, $AM_{11}{}^2$ is processed first, $AC_3$ is removed and $AC_4$ is added. The state is changed to $S_3$ and update message $UM_3$ is sent at time $U_3$. $AM^2{}_{21}$ processed next on state $S_3$ and $AC_1$ is removed and the state changes to $S_4$ and update message $UM_4$ is sent. Notice the sequence of state changes is reflected in FIG. 2. In the following section we describe a suite of algorithms that guarantees fair-order delivery of action messages to the server.

Fair-Ordered Message Delivery Algorithms

When a server sends the $i^{th}$ update message $UM_i$ to the players, the server proxy records the sending time $U_i$, and tags it with the update message number i or a function thereof. Similarly, when the proxy for player $P_j$ receives this message, it records in $R_j{}^i$ the reception time for this message. Further, when the $k^{th}$ action message is sent at time $A_{jk}{}^i$ in response to the $i^{th}$ update message, the player proxy uses $A_{jk}{}^i$ to calculate $\delta_{jk}{}^i$. The player proxy sends the action message along with the following information tagged to the message: (a) the update message number, i corresponding to this action message, (b) the reaction time $\delta_{jk}{}^i$, and (c) the $N_{jk}{}^i$ action message number, where all of the above may also be functions or some other representation corresponding the values to be indicated. The action messages are numbered in an increasing order starting from 1 and the numbering scheme spans different update messages. That is, if the last action message from a player corresponding to update message $UM_i$ is numbered m, the first action message from the same player corresponding to update message $UM_{i+1}$ will be numbered m+1. This numbering system is used in delivering messages in order. Thus, update message $UM_i$ from the server will be tagged with i at the proxy server and action message $AM_{jk}{}^i$ from player $P_j$ will be tagged with the three tuple (i, $\delta_{jk}{}^i$, $N_{jk}{}^i$). As would be understood, other numbering systems used to convey similar information may also be used. Because message number $N_{jk}{}^i$ is used to deliver action messages from the same player in sequence, we do not need to consider it until we consider action messages that arrive out of order.

At the server proxy, the expected round-trip time (excluding any reaction time at the player, of course) to each of the players or player proxies is computed using some standard algorithm such as for TCP. We denote by $W_j$ the wait timeout value for player $P_j$. The calculation of the round-trip time is independent of the message delivery algorithm. Let $rtt_j$ be the expected round-trip time from the server proxy to proxy for player $P_j$. An exponential averaging algorithm can be used to update the rtt based on the round-trip that is seen for a particular message as follows: $rtt_{new} = (1-\alpha) \times rtt_{old} + \alpha \times rtt_{current}$, where $rtt_{new}$ is the updated rtt, $rtt_{old}$ is the rtt that was calculated before, $rtt_{current}$ is the rtt for the current message and $\alpha$ is an exponential averaging factor where $0 < \alpha < 1$. In order to account for variances in round-trip time, the maximum amount of time that the server proxy will wait before timing out on an action message from a player will be some multiple of the round-trip time. Let $W_j$ denote this wait timeout value for player $P_j$. Thus, $W_j = b \times rtt_j$, where $b > 1$ is some constant.

When an action message is received at the server proxy, it is queued to be delivered to the game server; before it is queued, the following parameters are computed: (a) the position in the queue where this message should be inserted and (b) the local time at which the message is to be delivered to the game server. Every time an action message arrives, this arrival can lead to the re-computation of both the current position and the delivery time of messages in the queue. The relative position of the messages (i.e., position with respect to on another) already in the queue will not change, but their absolute positions may change because the arriving action message may be inserted anywhere in the queue. The delivery time of the messages may change and this change will always lead to the delivery time being shortened. These are properties of the fair-ordering message delivery algorithm described below. Note that the definition of fair-order delivery is only valid for messages arriving within their wait timeout values. An approach to deal with messages with network delay larger than their wait timeouts is discussed herein.

Position of a Message in the Delivery Queue

When an action message $AM_{jk}{}^i$ arrives at the server proxy, it is inserted into the delivery queue and the location where it is inserted is based on the values i and $\delta_{jk}{}^i$. The delivery queue is kept sorted based on the two tuple $(i, \delta)$ with the key i first and then the key $\delta$. Thus, an action message with the tuple (2, 3) will be positioned before another action message with the tuple (2, 4) and the action message with the tuple (2,4) will be positioned before another action message with the tuple (3, 2). This means, the messages are sorted in the ascending order of their corresponding update message ids and within the set of action messages corresponding to an update message, they are sorted in the ascending order of the reaction times. Note that when an action message arrives, it can be inserted anywhere in the queue and the relative positions of the existing messages in the queue do not change. The message delivery algorithm has the following main property.

Property 1: If the delivery queue is sorted based on the tuple $(i, \delta)$ with the key i first and then the key $\delta$, then fair-order delivery is ensured if the messages are delivered in the order they are found in the delivery queue.

The above property holds because sorting and delivering messages based on $(i, \delta)$ satisfies all three conditions of fair-ordering. Sorting the messages in the order of the update message ids (e.g., i) ensures that fair-order delivery Condition 3 is satisfied. In addition, further sorting the messages corresponding to an update message, using reaction times ensures fair-order Condition 2 and Condition 1. Note that the action message number (N) carried by the action message could have been used to ensure Condition 1, but it is not necessary since sorting action messages according to reaction times trivially ensures Condition 1.

Computation of Delivery Time of a Message

When an action message corresponding to an update message arrives at the server proxy, the algorithm shown in FIG. 5 is executed to insert the message into the delivery queue. The first step is to compute the delivery time $D(M_k)$ of the action message $M_k$ to the game server. Delivery time is computed such that any action message that may arrive out of fair-order at the server proxy is delivered to the game server in fair-order. In order to achieve this, messages may be queued in the server proxy and delivered according to the delivery time. We will show later (in Properties 2 and 3) that execution of step 2 of the algorithm does not modify the relative order of the messages that are already in the fair-ordered delivery queue. The delivery time of the existing messages are recomputed in step 4 only to deliver them earlier than their previously computed delivery time (refer to Property 3 herein).

We detail the procedure to compute the delivery time of a message in the following three sections. In a first section we assume that messages arrive at the server proxy in the order in which they are sent by the player and within their wait timeouts. A next section augments the previous section with messages arriving out of order but within their wait timeouts and a later section presents the most general case when messages do not arrive within their wait timeouts.

1) Messages arrive in order and within their wait time-out: Consider a set of action messages that have been received at the server proxy in response to update message $UM_i$ and have been fair-ordered and put in the delivery queue according to their reaction times. Let these action messages in the fair-ordered queue be $M_1, M_2, \ldots, M_n$. Let $D(M_k)$ denote the delivery time of action message $M_k$ and $P(M_1, M_2, \ldots, M_n)$ denote the set, which represents the union of all the players who sent messages $M_1, M_2, \ldots, M_n$. Let $\delta_k$ denote the reaction time for message $M_k$. Since $M_k$'s are fair-ordered, $\delta_1 \leq \delta_2 \leq \ldots \leq \delta_n$. Let T denote the set of all players. Then, the earliest possible delivery time for a message in the queue, based on messages arrived so far, will be as follows.

Definition 1: Computation of delivery time with in order message arrival and within their wait timeouts: Delivery time of message $M_k$, $1 \leq k \leq n$, in the fair-ordered queue is $D(M_k) = U_i + \max_{\{j \in T-P(M_k, M_{k+1}, \ldots, M_n)\}} \{W_j\} + \delta_k$.

Note that ordering the messages and delivering them according to their reaction times will ensure fair-ordering delivery of messages only if it is guaranteed that when an action message corresponding to an update message is delivered, no other action message corresponding to the same update message with a smaller reaction time may be in transit. Consider message $M_1$. The update message $UM_i$ corresponding to this action message was sent at time $U_i$. The reaction time for this message is $\delta_1$. Since we assumed messages arrive within wait timeout, if a message from another player $P_j$ corresponding to update message $UM_i$ with a reaction time smaller than $\delta_1$ is to arrive at the server proxy, it needs to arrive by time $U_i + W_j + \delta_1$. Considering all players, for a message with a reaction time smaller than $\delta_1$ to arrive from any player (including $P(M_1)$), it needs to arrive by time $U_i + \max_{\{j \in T\}} \{W_j\} + \delta_1$. But in order arrival ensures that action messages arrive at the server proxy in the order in which they are sent. This means no action messages from $P(M_1, M_2, \ldots, M_n)$ can be received with a reaction time smaller than $\delta_1$ given that action messages from all these players have been received with reaction times larger than or equal to $\delta_1$. That means, only players from whom no action message has been received need to be considered. Thus, $D(M_1) = U_i + \max_{\{j \in T-P(M_1, M_2, \ldots, M_n)\}} \{W_j\} + \delta_1$. In general, for $M_k$, no action messages from $P(M_k, M_{k+1}, \ldots, M_n)$ can be received with a reaction time smaller than $\delta_k$ given that action messages from all these players have been received with reaction times larger than or equal to $\delta_k$. Note that in this case, it is possible that another action message is received from $P(M_1, M_2, \ldots, M_{k-1})$ with a reaction time smaller than $\delta_k$. Then, there are only two sets of players need to be considered. One set is the players from whom no action messages have been received which are $T-P(M_1, M_2, \ldots, M_n)$, and the other is $P(M_1, M_2, \ldots, M_{k-1})$. This justifies the above definition.

It is necessary to ensure that the delivery times of messages computed using the above definition are consistent with the order in which the action messages are ordered in the delivery queue. If the delivery times satisfy this we call it a feasible delivery order. The delivery time computation defined above does lead to a feasible delivery order as argued below.

Property 2: Property of delivery time where messages arrive in order and within their wait timeouts: Message delivery time sequence $D(M_1), D(M_2), \ldots, D(M_n)$, is a feasible delivery order.

The above property holds because of the following reasoning. Since $M_1, M_2, \ldots, M_n$, are fair-ordered, $\delta_1 \leq \delta_2 \leq \ldots \leq \delta_n$ holds. Also notice that $$\max_{\{j \in T-P(M_1, M_2, \ldots, M_n)\}} \{W_j\} \leq$$
$$\max_{\{j \in T-P(M_2, M_3, \ldots, M_n)\}} \{W_j\} \leq \ldots \leq$$
$$\max_{\{j \in T-P(M_n)\}} \{W_j\}$$

Therefore, $D(M_1) \leq D(M_2) \leq \ldots \leq D(M_n)$. Thus the property follows.

The above property illustrates that given action messages, it is feasible to achieve fair-ordered delivery at the server by queuing them in fair-order at the server proxy and delivering them to the server according to their respective delivery times.

Definition 2: Recomputation of delivery time where messages arrive in order and within their wait timeouts: Suppose an action message $M_p$, $p > n$, $\delta_k \leq \delta_p \leq \delta_{k+1}$, is inserted into the delivery queue $M_1, M_2, \ldots, M_n$ conforming the fair-order. Then the delivery times of $M_1, M_2, \ldots, M_{p-1}$ are recomputed as, $D^{new}(M_m) = D(M_m) - \beta_m$, $1 \leq m \leq p$ where $\beta_m = \max_{\{j \in T-P(M_m, M_{m+1}, \ldots, M_n)\}} \{W_j\} - \max_{\{j \in T-P(M_m, M_{m+1}, \ldots, M_k, M_p, M_{k+1}, \ldots, M_n)\}} \{W_j\}$. For $p \leq m \leq n$, $D(M_m)$ does not change, therefore $D^{new}(M_m) = D(M_m)$.

Note that the computation of the delivery time of $M_p$ with reaction time $\delta_p$, and recalculation of delivery times of $M_1, M_2, \ldots, M_n$ are straightforward from Property 1 and Definition 1. Since $\delta_k \leq \delta_p \leq \delta_{k+1}$, according to Property 1, $M_p$ is inserted between $M_k$ and $M_{k+1}$ in the delivery queue, and the new message order becomes $M_1, M_2, \ldots, M_k, M_p, M_{k+1}, \ldots, M_n$. Since the message order has changed, following Definition 1, $D^{new}(M_l)$ we compute the new delivery times for message $M_l$, $1 \leq l \leq n+1$, as follows:

$$D^{new}(M_1) = U_i + \max_{\{j \in T-P(M_1, M_2, \ldots, M_k, M_p, M_{k+1}, \ldots, M_n)\}} \{W_j\} + \delta_1$$

$$D^{new}(M_2) = U_i + \max_{\{j \in T-P(M_2, \ldots, M_k, M_p, M_{k+1}, \ldots, M_n)\}} \{W_j\} + \delta_2$$

$$\vdots$$

$$D^{new}(M_k) = U_i + \max_{\{j \in T-P(M_k, M_p, M_{k+1}, \ldots, M_n)\}} \{W_j\} + \delta_k$$

$$D^{new}(M_p) = U_i + \max_{\{j \in T-P(M_p, M_{k+1}, \ldots, M_n)\}} \{W_j\} + \delta_p$$

$$D^{new}(M_{k+1}) = U_i + \max_{\{j \in T-P(M_{k+1}, \ldots, M_n)\}} \{W_j\} + \delta_{k+1}$$

$$\vdots$$

$$D^{new}(M_n) = U_i + \max_{\{j \in T-P(M_n)\}} \{W_j\} + \delta_n$$

It can be observed that when a newly arrived message is inserted into the delivery queue, the delivery times for messages behind it are not changed. The delivery times for messages ahead of it either shorten or do not change. This is because the set of players whose wait timeout values are considered in the formula decreases by one, i.e., $P(M_p)$. The algorithm, as it is specified, requires that the delivery time of all messages ahead of the newly arriving message be recalculated every time a message arrives. Arrival of every message could potentially shorten the delivery time of every message ahead of it and hence make the game progress faster. But this computation is not required to maintain feasible delivery order. If it is observed that the overhead of recomputing the delivery time is high, the recalculation could be performed after the arrival of a number of messages (rather than every message). This would require information to be kept about all the messages that arrive within two such recalculations and apply this information when recalculation is performed. The tradeoff between processing overhead and delayed message delivery can be adjusted by properly choosing the number of message arrivals to wait before recalculation. The delivery times of the action messages ahead of it can be incrementally updated as defined in Definition 2.

Property 3: Property of recomputed delivery time when messages arrive in order and within their wait timeouts: If the message delivery time sequence $D(M_1)$, $D(M_2), \ldots, D(M_n)$ is a feasible delivery order and a newly arrived message $M_p$ is fair-orderly inserted between $M_k$ and $M_{k+1}$, then the sequence of recomputed message delivery times, $D^{new}(M_1), D^{new}(M_2), \ldots, D^{new}(M_n), D^{new}(M_{n+1})$, remains a feasible delivery order.

The above property holds because of the following reasoning. Since message delivery time $D(M_r)$, $1 \leq r \leq n$, is in a feasible delivery order, we know that $D(M_1) \leq D(M_2) \leq \ldots \leq D(M_k) \leq D(M_{k+1}) \leq \ldots \leq D(M_n)$. We also know that $D^{new}(M_m)$, $1 \leq m < p$, are the only deliver times that may have changed and may be different from $D(M_m)$, $1 \leq m < p$ due to the fair-ordered insertion. Since $D^{new}(M_m)$, $1 \leq m \leq p$ are computed using Definition 1, we know from Property 2 that $D^{new}(M_1) \leq D^{new}(M_2) \leq \ldots \leq D^{new}(M_k) \leq D^{new}(M_p)$. Since $D^{new}(M_m)$, $k+1 \leq m \leq n$ are the same as $D(M_m)$, $k+1 \leq m \leq n$, we also know that $D^{new}(M_{k+1}) \leq D^{new}(M_{k+2}) \leq \ldots \leq D^{new}(M_n)$. Since $\max_{\{j \in T-P(M_p, M_{k+1}, \ldots, M_n)\}}\{W_j\} \leq \max_{\{j \in T-P(M_{k+1}, \ldots, M_n)\}}\{W_j\}$, we note that $D^{new}(M_p) \leq D^{new}(M_{k+1})$ and that $D(M_{k+1}) = D(M_k)$. Thus we conclude that $D^{new}(M_1) \leq D^{new}(M_2) \leq \ldots \leq D^{new}(M_k) \leq D^{new}(M_p) \leq D(M_{k+1}) \leq \ldots \leq D(M_n)$. This means that the feasible delivery order is still maintained for the recomputed message delivery times.

The above property establishes the fact that if the server proxy keeps the message delivery queue always sorted according to the fair order, and recomputes the delivery times of the affected messages due to the insertion of a newly arrived message, the fair-order delivery of messages to the game server can be ensured.

2) Messages arrive out of order but within their wait timeouts: Let us now consider the situation where action messages from a player can arrive at the server proxy out of order. The action message numbers carried in the action messages are now used to (1) order the messages from a specific player and (2) when a message arrives determine whether all earlier messages that were sent by the same player have already arrived. When messages arrive, they are fair-ordered in the delivery queue based on their reaction times as before, but now, delivery times are computed accounting for the fact that messages may arrive out of order.

Assuming that the delivery queue contains messages $M_1, M_2, \ldots, M_n$ in that order, let $Q(M_1, M_2, \ldots, M_n)$ denote the subset of messages within $M_1, M_2, \ldots, M_n$ which are sequenced in the sense that all messages from the players $P(Q(M_1, M_2, \ldots, M_n))$ that were sent before have already been received and have either (a) been delivered to the server or (b) been placed in the delivery queue. Then the delivery times will be computed as follows.

Definition 3: Computation of delivery time with messages arriving out of order but within their wait timeouts: Delivery time of message $M_k$, $1 \leq k \leq n$, in the fair-ordered queue is $D(M_k) = U_t + \max_{\{j \in T-P(Q(M_k, M_{k+1}, \ldots, M_n))\}}\{W_j\} + \delta_k$.

This definition follows similar reasoning as Definition 1. The only difference here is that the delivery time of message $M_k$ must consider the possible arrival of out of order messages with smaller reaction times than $\delta_k$ for all messages that are not sequenced.

The following property ensures that delivery times, as computed above, lead to a feasible delivery order.

Property 4: Property of delivery time when messages arrive out of order but within their wait timeouts: Message delivery time sequence $D(M_1), D(M_2), \ldots, D(M_n)$, is a feasible delivery order.

This property can be shown to hold following reasoning similar to those for Property 2. The delivery times of the messages after the insertion of the new message can be computed using procedure similar to the previous case. Further, it can be shown that the newly computed delivery times will satisfy a feasible delivery order using reasoning similar to that used for Property 3.

3) Messages do not arrive within their wait timeout: Let us now consider the situation when messages may arrive after their wait timeout. Consider the example shown in FIGS. 6A and 6B with two players $P_1$ and $P_2$. The sequence numbers of messages are shown below the messages. In FIG. 6A, the delivery queue is shown with messages $M_1$, $M_3$ and $M_4$ from $P_1$ and $M_2$ from $P_2$. Assume that the message from $P_1$ with the sequence number 101 has not arrived yet. Consider message $M_2$ from $P_2$. With respect to this message, $M_3$ and $M_4$ are not sequenced according to the definition of Q given previously.

Assume that the delivery time for $M_1$ is reached before the message with sequence number 101 from $P_1$ arrives. This means, the wait timeout value for this message has been exceeded. Message $M_1$ will be delivered and the message with sequence number 101 will be marked late and delivered to the game server immediately when it arrives. The server proxy could also drop late messages. However, as the server proxy is not aware of game semantics, it may be more appropriate for the server proxy to deliver the message to the game server and let the game server decide how to process it.

When $M_1$ is delivered, messages $M_3$ and $M_4$ will become sequenced with respect to $M_2$ as shown in FIG. 6B. This means, the delivery time of $M_2$ needs to be recomputed. That is, when messages can arrive after their wait time-outs, delivery times of messages in the queue need to be updated even when messages are delivered in addition to being updated when messages arrive (for the cases when messages arrive within their wait timeout, as described in previous sections, delivery times have to be updated only when messages arrive). In this case, the computation of delivery times is exactly as indicated in Definition 3 when messages get delivered as well as when messages arrive. Property 4 holds for this case as well, except when the message at the head of the queue is delivered, recomputation of delivery time is needed for all messages in the queue. We add the dequeuing algorithm presented in FIG. 7 when messages do not arrive within their wait timeout. When a message with sequence number 101 arrives, it will be tagged as a late message and delivered immediately to the game server. As it had already been marked as late and delivery times of the messages in the queue had been updated based on this, no recomputation of delivery times is needed at this point.

4) Correlation of action message delivery time: So far we have computed the delivery time of action messages corresponding to an update message $UM_i$ in isolation, that is, without considering the delivery times of the action messages corresponding to update message $UM_{i-1}$. The delivery queue is kept sorted based on the tuple $(i, \delta)$. Action messages are delivered to the game server in this order. That is, all action messages corresponding to update message $UM_{i-1}$ are delivered before any action message corresponding to update message $UM_i$ is delivered. This correlated decision overrides the delivery times computed for an action message considering the corresponding update message in isolation.

The game application must define what all action messages corresponding to an update message signify. Action messages corresponding to an update message can arrive at any time and assuming that players can send any number of action messages per update message, a determination must be made when not to accept any more action messages corresponding to an update message. Let us assume that this decision is made based on some technique determined by the game application. When this determination is made for update message $UM_{i-1}$ let us assume that the delivery time computed for the last action message $L_{i-1}$ corresponding to $UM_{i-1}$ in the delivery queue to be $t_{i-1}$. Any action message corresponding to $UM_{i-1}$ that arrives after $L_{i-1}$ has been delivered will be dropped. Of course, any action message corresponding to $UM_{i-1}$ that arrives at the server proxy before $L_{i-1}$ is delivered, and is deemed to be delivered before $L_{i-1}$, will be delivered. Let $D^i(M_1), D^i(M_2), \ldots, D^i(M_n)$ denote the delivery times of messages $M_1, M_2, \ldots, M_n$ that are in the delivery queue and correspond to update message $UM_i$. Then, the delivery time of message $M_k$, $1 \leq k \leq n$, as computed in the previous section must be modified as: $D^i(M_k) = \max\{t_{i-1}, U_i + \max_{\{j \in T-P(Q(M_k, M_{k+1}, \ldots, M_n))\}}\{W_j\} + \delta_k\}$. This ensures that all action messages corresponding to update message $UM_{i-1}$ are delivered before any action message corresponding to update message $UM_i$ is delivered. Note that the delivery times computed above can change due to both message arrivals and message deliveries. The change could be (a) due to a change in $t_{i-1}$, which could be due to the arrival or delivery of an action message corresponding to update message $UM_{i-1}$ or earlier update messages, or, (b) due to an arrival of an action message corresponding to update message $UM_i$ which will lead to a change in the second component on which maximum is computed.

Fairness Among Players with Inconsistent Views

The fair-ordered message delivery algorithm described previously assumes that when an action message is sent by a player proxy, it carries the tuple (i,δ) where i is the update message id of the most recent update message $UM_i$ received at the player. In our discussion of the algorithm, we implicitly assumed that all players receive $UM_i$, update their states and then send the action messages corresponding to $UM_i$. In practice it may so happen that a new update message $UM_{i+1}$ sent by the server does not reach a set of players or is delayed compared to the rest of the players. Therefore, the players with the most up-to-date information send all their action messages tagged with update message id i+1 by the player proxies, whereas the remaining players send action messages tagged with the previous update message id i. This situation, where action messages and update messages cross each other, may lead to unfairness among the players. The unfairness arises due to the inconsistency in the view of the game that each player possesses. We first describe the problem with the help of an example and then describe the steps taken in the fair-ordered message delivery system of the invention to overcome this.

Figure 8:
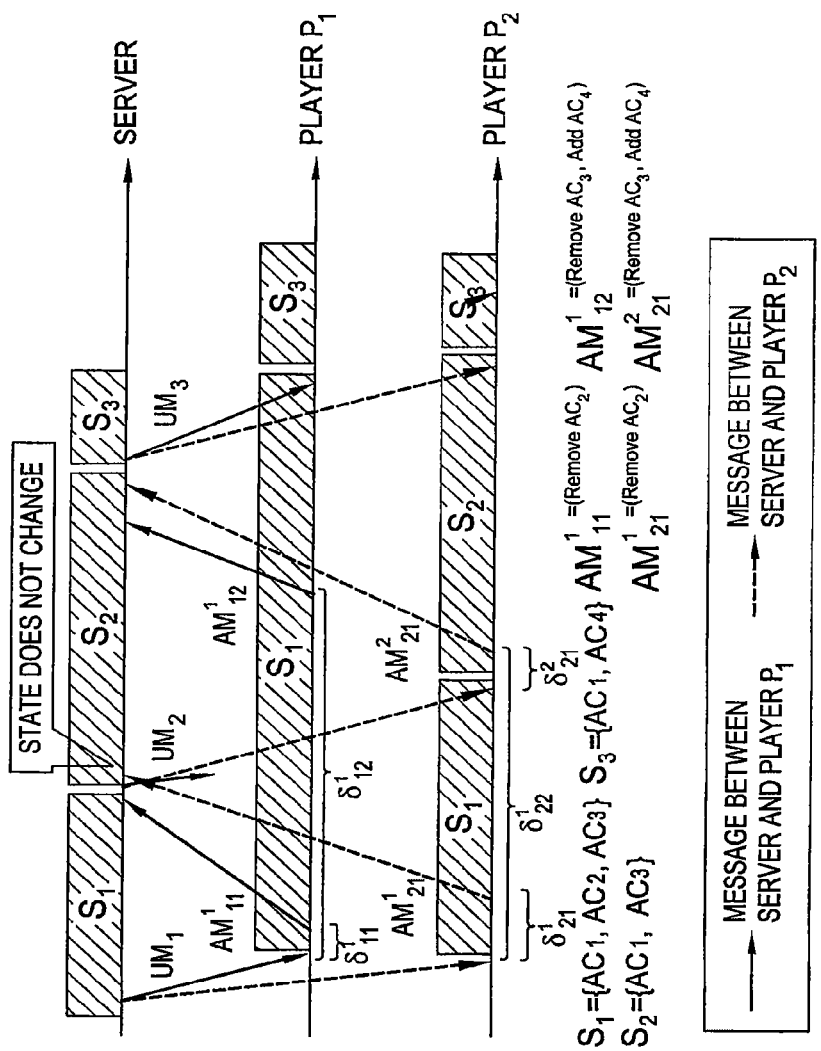
FIG. 8 shows an example message sequence illustrating inconsistent views of a game between players.

Consider the same example shown in FIG. 2, with a slightly different update and action message sequence than the one in FIG. 4. The message sequence is shown in FIG. 8. Assume that when $UM_1$ is received, players $P_1$ and $P_2$ send action messages $AM_{11}^1 = \langle \text{Remove } AC_2 \rangle$ and $AM_{21}^1 = \langle \text{Remove } AC_2 \rangle$, respectively, with $\delta_{21}^1 > \delta_{11}^1$. $AM_{11}^1$ gets delivered (when its delivery time is reached) by the server proxy to the game server. The server changes state to $S_2$ and sends update message $UM_2$. Assume that $UM_2$ reaches $P_2$ but does not reach $P_1$. At this time, the state according to $P_1$ is $S_1$, and the state according to $P_2$ is $S_2$. Assume now that both $P_1$ and $P_2$ send action messages $AM_{12}^1 = \langle \text{Remove } AC_3, \text{Add } AC_4 \rangle$, and $AM_{21}^2 = \langle \text{Remove } AC_3, \text{Add } AC_4 \rangle$. Note that $AC_3$ is part of both $S_1$ and $S_2$. The action message from $P_1$ will carry the tuple $(i, \delta_{12}^1)$ and that from $P_2$ will carry the tuple $(2, \delta_{21}^2)$. The reaction time $\delta_{12}^1$ has been computed to be the interval between the time $UM_1$ is received at $P_1$ to the time $AM_{12}^1$ was sent by $P_1$. The reaction time $\delta_{21}^2$ has been computed to be the interval between the time $UM_2$ is received at $P_2$ to the time $AM_{21}^2$ was sent by $P_2$. Thus, these two reaction times are not directly comparable although it is possible that if the reaction times of both the players had been compared from the time each received $UM_1$, $P_2$ had a faster reaction time. The way the algorithm is described, given that all action messages corresponding to $UM_1$ will be processed before any action messages corresponding to $UM_2$, $P_1$'s action on $AC_3$ and $AC_4$ will be processed before $P_2$'s action on $AC_3$ and $AC_4$, thus being unfair to $P_2$.

To remove this unfairness, when action messages are sent by players, a set of tuples are tagged onto each of these action messages by their proxies each representing the reaction time from the time a set of update messages are received. The set of update messages, which we refer to as the window, for which this information needs to be sent is indicated by the server proxy when it sends an update message. In the above example, when $P_1$ and $P_2$ send action messages $AM_{12}^1$ and $AM_{21}^2$, respectively to remove $AC_3$ and add $AC_4$, $P_1$ sends the tuple $(1, \delta_{12}^1)$ because it has seen only $UM_1$ when it sent this action message, but $P_2$ sends both tuples $(1, \delta_{22}^1)$ and $(2, \delta_{21}^2)$. That is, $P_2$ indicates that it is sending this action message with a reaction time of a $\delta_{22}^1$ from the time it received $UM_1$ and a reaction time of $\delta_{21}^2$ from the time it received $UM_2$. At the server proxy, message splitting is performed. The action message sent by $P_1$ is put in the delivery queue with the messages corresponding to $UM_1$ and is fair-ordered based on $\delta_{12}^1$ but the action message from $P_2$ is split and inserted in two places, one with the messages corresponding to $UM_1$ where it is fair-ordered based on $\delta_{22}^1$ and the other with messages corresponding to $UM_2$ where it is fair-ordered based on $\delta_{21}^2$. If $\delta_{22}^1$ is smaller than $\delta_{12}^1$, the action $\langle \text{Remove } AC_3, \text{Add } AC_4 \rangle$ from $P_2$ is delivered to the game application before the action $\langle \text{Remove } AC_3, \text{Add } AC_4 \rangle$ from $P_1$.

A question may be raised as to why the action message from $P_2$ was split and put together with the action messages corresponding to update message $UM_2$ as well. This is because, the server proxy can only relate the action and update messages, but has no idea about the semantics of the action that is being performed—as it is transparent to the game application. Because of this, it has no choice, but to put the action message from $P_2$ together with action messages corresponding to $UM_2$ as well. When the "split" messages are delivered by the server proxy to the game server, it a) indicates that this is a "split" message and b) provides the correspondence between this action message and the update message to which this action message was mapped; from this, the game server knows the state to which the action message should be applied. Given this, the redundant "split" message should lead to a "no operation" when it is delivered and processed by the application running on the game server, as the action $\langle \text{Remove } AC_3, \text{Add } AC_4 \rangle$ has already been performed by the game server. Note that the game server can filter out redundant copies of "split" messages once it knows that a message is a "split" message irrespective of the actions specified in the message.

It should be noted that action messages forwarded by the server proxy to the game server do require extra information to be tagged. Examples of such information include the update message number corresponding to the action message as well as information about whether a message is a late message or a "split" message. Because application specific information does not need to be passed in these messages, the fair-order algorithms are game application transparent.

We mentioned that a window of update messages for which reaction times are needed is indicated by the server proxy to the player proxies. This window is based on the determination by the server proxy about when to stop accepting action messages corresponding to a particular update message. In the example, when $UM_3$ is sent by the server proxy, if it is still accepting action messages corresponding to $UM_1$, which means it still has not delivered the last action message $L_1$ corresponding to $UM_1$, it indicates the window to be [$UM_1$, $UM_2$, $UM_3$]. If it has already delivered $L_1$, it indicates this window to be [$UM_2$, $UM_3$]. Determining the size of the window is an open issue. As would be understood, the game server's application can help in this regard.

EXAMPLES

Figure 9:
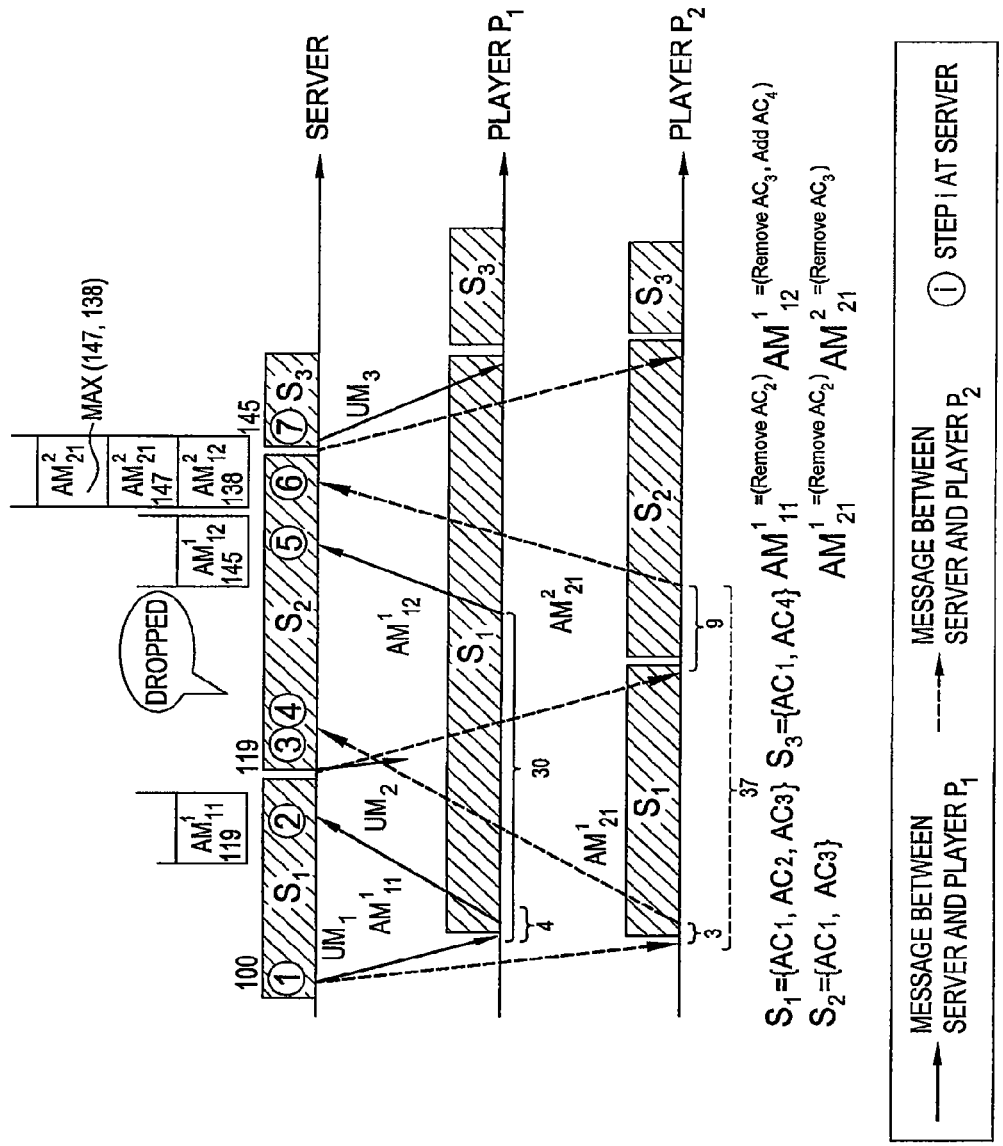
FIG. 9 shows a message sequence illustrating the fair-order message delivery service of the present invention.

Let us consider an example, which illustrates the fair-order message delivery algorithms of the present invention by showing the computation of the delivery times. Let us take the example shown in FIG. 8 and add timing information to it. The resulting figure is shown in FIG. 9. The timing information shown is in terms of a logical clock. The delivery queue at the time of specific events is shown in the figure, on top of those events. State changes trigger update messages to be sent and for the purpose of timing calculations, it is assumed that these messages are sent instantaneously after a state change.

Referring to FIGS. 8 and 9, the game session consists of two players $P_1$ and $P_2$ and a Server. We use $D^i(AM_{jk}^i)$ to denote the delivery time for action message $AM_{jk}^i$ corresponding to update message $UM_j$. Assume that the wait timeouts for the two players are $W_1=10$ and $W_2=15$. The following describes the various sequences in the game according to the present invention as illustrated in FIGS. 8 and 9.

1) At time 100, the state of the game is $S_1$ which consists of objects $AC_1$, $AC_2$ and $AC_3$. Update message $UM_1$ is sent by the server informing the players of this state. The window sent is [$UM_1$]. $UM_1$ is received at $P_1$ and $P_2$. They send action messages $AM_{11}^1$ and $AM_{21}^1$. The tuples sent with these messages are (1, 4) and (1, 3) respectively.

2) $AM_{11}^1$ is received at the server proxy (and has arrived in order which is verified by looking at the sequence number), and is put in the delivery queue. According to Definition 1, its delivery time is calculated as $D^1(AM_{11}^1)=100+15+4=119$.

3) $AM_{11}^1$ is delivered to the server at 119 and credit for removing $AC_2$ is given to $P_1$. Any action message corresponding to $UM_1$ with a reaction time equal to or smaller than 4 that is received later will be dropped (such a message will be received only if it reaches after its wait timeout). The state of the game is changed to $S_2$ which consists of the objects $AC_1$ and $AC_3$. The update message $UM_2$ is sent to the players. The window sent is [$UM_1$, $UM_2$]

4) $AM_{21}^1$ is received at the server proxy. This message has a reaction time smaller than the reaction time of an already delivered message corresponding to $UM_1$ and is dropped. $UM_2$ is received at $P_2$ but is lost on its way to $P_1$. Action messages $AM_{12}^1$ and $AM_{21}^2$ are sent by players $P_1$ and $P_2$. $AM_{12}^1$ carries only the tuple (1, 30) as $UM_2$ was not received at $P_1$. $AM_{21}^2$ carries the tuples (1, 37) and (2, 9).

5) $AM_{12}^1$ is received at the server proxy. This message has arrived in order and so the delivery time for this message is calculated as $D^1(AM_{12}^1)=100+15+30=145$ according to Definition 1.

6) $AM_{21}^2$ is received at the server proxy. This message also has arrived in order. As this message carries two tuples, it is split into two messages and is put twice in the queue, once as an action message corresponding to $UM_1$ and the other as an action message corresponding to $UM_2$ (in this case, this is the first action message received at the server corresponding to $UM_2$). The delivery time for the first copy is calculated as $D^1(AM_{21}^2)=100+10+37=147$. The delivery time for the second copy, considered in isolation with respect to action messages corresponding to $UM_2$, will be $D^2(AM_{21}^2)=119+10+9=138$. But the action message delivery times need to be correlated with other action messages such that all action messages corresponding to update message $UM_1$ should be delivered before any action message corresponding to $UM_2$ is delivered. Thus $D^2(AM_{21}^2)$ is calculated as Max(147, 138)=147. Also, the delivery time for $AM_{12}^1$ which is already in the queue is updated to be $D^1(AM_{12}^1)=100+30=130$. Assume that the current time is 145. 130 is smaller than the current time and hence $AM_{12}^1$ is delivered right away.

7) Once $AM_{12}^1$ is delivered to the server and is processed, the credit for removing $AC_3$ and adding $AC_4$ is given to $P_1$. The state of the game is changed to $S_3$ which consists of objects $AC_1$ and $AC_4$. The update message $UM_3$ is sent to the players. Assume that the window sent is [$UM_3$]. This means, the server proxy does not wish to receive any more action messages corresponding to $UM_1$ and $UM_2$. As mentioned earlier, the decision about the window has to be made in some fashion, may be even with the help of communication between the game server and the server proxy. At time 147, two copies of $AM_{21}^2$ are delivered, both of which becomes no-ops as $AC_3$ has already been removed.

Figure 10:
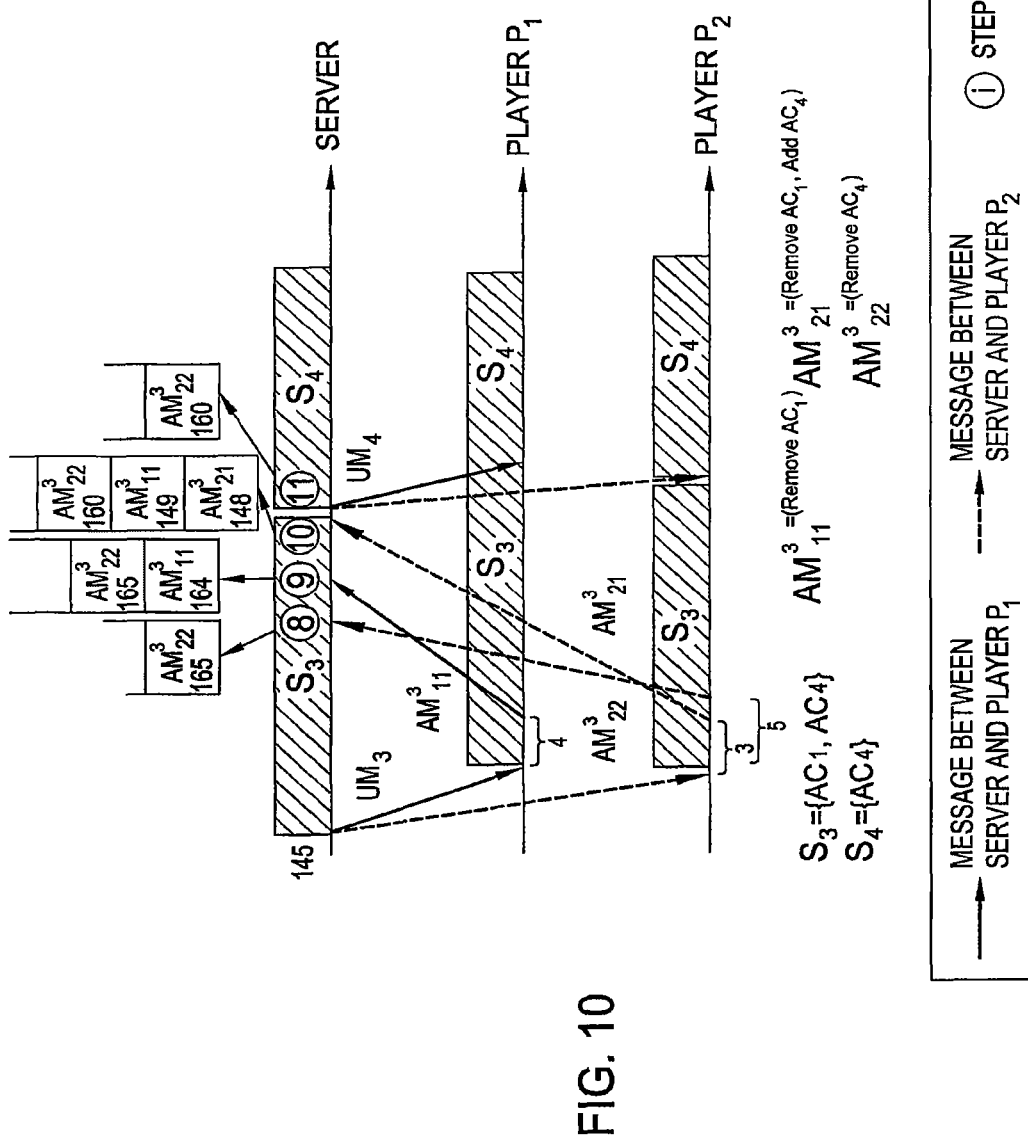
FIG. 10 shows another message sequence illustrating the fair-order message delivery server of the present invention with out-of-order message reception.

Let us now extend the above example to show the effect of out-of-order reception of action messages. Refer now to FIG. 10 with respect to the following discussion.

8) $AM_{22}^3$ is received at the server proxy (and is out-of-order) and is put in the delivery queue. The delivery time is computed as $D^3(AM_{22}^3)=145+\max(10,15)+5=165$ based on Definition 3. Note that as $AM_{22}^3$ has been received out of order, it is possible to receive a message from $P_2$ with a reaction time smaller than 5 and hence the wait timeout of $P_2$ needs to be considered. Refer to the definition of Q set forth previously.

9) $AM_{11}^3$ is received at the server proxy (and is in-order) and is put in the delivery queue. The delivery time is computed as $D^3(AM_{11}^3)=145+15+5=164$. Again, the wait timeout of $P_2$ needs to be considered as the message currently in the queue from $P_2$ has arrived out of order.

10) $AM_{21}^3$ is received at the server proxy (and is in-order) and is put in the delivery queue. Now, message $AM_{22}^3$ in the queue also becomes in-order. Using Definition 1, the delivery times of all the messages in the queue are computed as:

$$D^3(AM_{21}^3)=145+3=148$$

$$D^3(AM_{11}^3)=145+4=149$$

$$D^3(AM_{22}^3)=145+10+5=160$$

The delivery times for $AM_{21}{}^3$ and $AM_{11}{}^3$ will be smaller than the current time (note that the current time is at least 150 as message $AM_{22}{}^3$ has been received with a reaction time of 5 in response to $UM_3$ which was sent at time 145). These messages will be delivered with $P_2$ getting the credit for removing $AC_1$ and adding $AC_4$. In this case $AM_{11}{}^3$ will be a no-op.

11) The update message $UM_4$ is sent to the players. At time 160, message $AM_{22}{}^3$ will be delivered to the server and the credit for removing $AC_4$ will be given to $P_2$.

The present invention provides a framework called Fair-Ordering Service to achieve fairness in a distributed, client-server based, multi-player game environment. The framework consists of having proxies for both the game server and the game players, referred to as server proxy and player proxy, respectively. The server proxy is responsible for delivering players' actions in a fair order to the game server. This is achieved by tagging messages with extra information at the origin proxy, and processing the extra information at the destination proxy, keeping both the server and the players oblivious to the fair-order delivery process. This transparency allows the proxies to be used for a number of different game applications.

Although the framework is kept independent of game applications, it is possible to use some application specific information to further optimize the fair delivery of messages, that is, deliver the messages even sooner than what has been proposed. The game application may also help in deciding some of the parameters of the proxy, for example, the maximum wait timeout after which to declare an action message from a player too late to be delivered to the game server, or the size of the window of update messages opened up by the server proxy. They can be treated as input parameters to a proxy's configuration.

FIG. 11 shows an exemplary block diagram of a proxy device 110 according to the present invention. In general, the device includes at least two functional blocks, which operate in connection with a processor 120. A first block 130 is a queue where received transmissions are stored and wherein certain transmissions are reordered as has already been explained. A next block 140 is a memory device for storing instructions, for example in software, in order to carry out the methodologies of the present invention. The proxy device also includes input and output ports 150, 160.

For clarity of explanation, the illustrative embodiment of the present invention has been described as comprising individual functional blocks and/or boxes. The functions these blocks and/or boxes represent may be provided through the use of either shared or dedicated hardware, including, but not limited to, hardware capable of executing software. Use of the term "processor" should not be construed to refer exclusively to hardware capable of executing software. Further, the illustrative embodiment may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

To further illustrate the present invention, we categorize update messages. These are messages sent by the game server to the game players. There are two cases, one case is when there is only one update message, therefore, all action messages correspond to this update message. The other case is when there are multiple update messages, therefore, it is not clear to which update message a particular action message corresponds. Obviously case one is the degenerate case of case two. For case two, we need to use the "message split" mechanism, where at the player proxy, each action message is associated with a window of update messages, and for each update message, a reaction time is calculated. An action message is therefore inserted into multiple queues each corresponding to one update message in its window.

Second, we categorize on action messages considering only one update message. We have three cases: 1) when action messages arrive in order and within their wait timeout periods, 2) when action messages arrive out of order but within their wait timeout periods, 3) when action messages arrive outside their wait timeout periods. Again, here case 3) is the most general case, it degenerates to case 2) and case 1).

Third, we consider a sequence of update messages, and the correlation of action message delivery time. When a sequence of update messages are considered, a delivery time formula (X) is presented taking into account the delivery time for the last action message for the previous update message. This formula applies to cases 1), 2) and 3) since 1) and 2) are degenerates of case 3).

The invention further illustrates a method of separating the computation of the delivery time into three scenarios: 1) when action messages arrive in order and within their wait timeout periods, 2) when action messages arrive out of order but within their wait timeout periods, 3) when action messages arrive outside their wait timeout periods. When messages arrive in order and within their wait timeout periods the local delivery time of an action message at the server proxy should be calculated before being inserted to the delivery queue, and recalculated upon new action message arrival according to Definition 1. This delivery time guarantees that when an action message corresponding to an update message is delivered, no other action message corresponding to the same update message with a smaller reaction time may be in transit.

When messages arrive out of order to order messages from a specific player and to determine whether all earlier messages sent by said player have arrived, the local delivery time of an action message at the server proxy should be calculated before being inserted to the delivery queue, and recalculated according upon new action message arrival according to Definition 3. When messages do not arrive within wait timeout. —i.e. when not to accept any more action messages corresponding to a update message, the local delivery time of an action message at the server proxy should be calculated before being inserted to the delivery queue, and recalculated according upon new action message arrival and action message delivery according to Definition 3. Using this reasoning, we use the formula (X) combined with update message window, "message splitting" mechanism as the generic algorithm to implement in the framework.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims.

What is claimed is:

1. A method of providing a fair exchanging of messages to players in a distributed multi-player game, the distributed multi-player game using a game server configured for generating update messages for the players and receiving action messages from the players, the method comprising the steps of:
    propagating a plurality of update messages generated by the game server, wherein the update messages are intended for a player;
    receiving an action message generated by the player, wherein the action message comprises a plurality of reaction times associated with the respective plurality of update messages intended for the player, wherein, for each of the update messages, the associated reaction time is indicative of a time difference between a reception of the update message at the player and transmission of the action message by the player; and
    queuing the action message for processing by the game server, wherein the action message is queued using the reaction times included within the action message, wherein queuing the action message for processing by the game server comprises:
    for each of the reaction times included in the action message:
        identifying an update message with which the reaction time is associated;
        identifying a queue associated with the identified update message with which the reaction time is associated; and
        queuing the action message within the identified queue using the reaction time.

2. The method of claim 1, further comprising:
    receiving the update messages from the game server at a server proxy associated with the game server; and
    propagating the update messages from the server proxy toward the player.

3. The method of claim 1, wherein the action message is generated by the player, wherein the action message comprises a plurality of tuples associated with the respective plurality of reaction times, wherein each tuple comprises an identification of an update message and an associated reaction time calculated for the update message.

4. The method of claim 1, wherein the reaction times are calculated by a player proxy associated with the player, and inserted into the action message by the player proxy when the player proxy receives the action message from the player.

5. The method of claim 1, wherein the reaction times are calculated by a player proxy associated with the player, wherein the reaction times are calculated by a method comprising:
    receiving the update messages at the player proxy;
    determining, for each of the update messages, the reception time of the update message;
    receiving the action message at the player proxy;
    determining the reception time of the action message; and
    for each of the update messages, calculating the reaction time for the update message using a difference between the reception time of the action message and the reception time of the update message.

6. The method of claim 1, further comprising:
    propagating, toward a player proxy associated with the player, an indication of a window of update messages for which the game server is still accepting action messages from the players.

7. The method of claim 1, wherein the action message is queued such that actions message are arranged in an order of increasing update message number and are further arranged for each update message in an order of increasing reaction time.

8. A method of providing a fair exchange of messages to players of a distributed multi-player game, the distributed multi-player game using a game server configured for generating update messages for the players and receiving action messages from the players, the method comprising the steps of:
    receiving a plurality of update messages generated by the game server and intended for the player;
    receiving an action message generated by the player and intended for the game server;
    calculating, for each of the update messages, a reaction time for the respective update message, wherein, for each of the update messages, the associated reaction time is indicative of a time difference between a reception of the update message at the player and transmission of the action message by the player;
    updating the action message to include the reaction times for the respective update messages; and
    propagating, toward the game server, the updated action message including the reaction times for the respective update messages;
    wherein the updated action message including the reaction times is adapted for use in queuing the action message for processing by the game server, wherein queuing the action message for processing by the game server comprises, for each of the reaction times included in the action message: identifying an update message with which the reaction time is associated, identifying a queue associated with the identified update message with which the reaction time is associated, and queuing the action message within the identified queue using the reaction time.

9. The method of claim 8, wherein the action message comprises a plurality of tuples associated with the respective plurality of reaction times, wherein each tuple comprises an identification of an update message and an associated reaction time calculated for the update message.

10. The method of claim 8, wherein calculating the reactions times for the update messages comprises:
    determining, for each of the update messages, a reception time of the update message;
    determining a reception time of the action message; and
    for each of the update messages, calculating the reaction time for the update message using a difference between the reception time of the action message and the reception time of the update message.

11. The method of claim 8, wherein the plurality of received update messages for which the respective reaction times are calculated comprises a subset of update messages from a set of update messages generated for the player since an action message was last received from the player, wherein calculating the reaction times for the update messages comprises:
- identifying, from the set of update message generated for the player since an action message was last received from the player, the update messages in the subset of update messages; and
- for each of the identified update messages in the subset of update messages, calculating the reaction time for the respective update message.

12. The method of claim 11, wherein the update messages in the subset of update messages are identified using a window of update messages, wherein the window of update messages identifies update messages for which the game server is still accepting action messages from the players.

13. The method of claim 8, further comprising:
- receiving, at a player proxy associated with the player, an indication of a window of update messages for which the game server is still accepting action messages from the players.

14. The method of claim 8, wherein the action message including the reaction times is propagated toward a game proxy associated with the game server.

* * * * *